(12) United States Patent
Kapaan et al.

(10) Patent No.: US 7,007,775 B2
(45) Date of Patent: Mar. 7, 2006

(54) SCREW ACTUATOR WITH A FIXED NUT

(75) Inventors: Henk Kapaan, Nieuwegein (NL); Alexander De Vries, Tiel (NL); Carl Vissers, Den Dungen (NL)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/498,454

(22) PCT Filed: Dec. 12, 2002

(86) PCT No.: PCT/IB02/05331

§ 371 (c)(1),
(2), (4) Date: Oct. 8, 2004

(87) PCT Pub. No.: WO03/050431

PCT Pub. Date: Jun. 19, 2003

(65) Prior Publication Data

US 2005/0092558 A1 May 5, 2005

(30) Foreign Application Priority Data

Dec. 13, 2001 (IT) .......................... TO2001A1163

(51) Int. Cl.
*F16D 66/00* (2006.01)
(52) U.S. Cl. ................. 188/1.11 E; 188/71.9; 188/72.8; 188/156; 188/162
(58) Field of Classification Search .......... 188/1.11 R, 188/1.11 E, 71.9, 72.7, 72.8, 156, 162
See application file for complete search history.

(56) References Cited

U.S. PATENT DOCUMENTS

| 4,852,699 | A | | 8/1989 | Karnopp et al. | |
|---|---|---|---|---|---|
| 6,000,507 | A | * | 12/1999 | Bohm et al. | 188/158 |
| 6,230,854 | B1 | * | 5/2001 | Schwarz et al. | 188/156 |
| 6,279,690 | B1 | * | 8/2001 | Schaffer | 188/71.9 |
| 6,598,714 | B1 | * | 7/2003 | Rinsma et al. | 188/71.9 |
| 6,607,059 | B1 | * | 8/2003 | Kapaan et al. | 188/72.8 |
| 6,666,308 | B1 | * | 12/2003 | De Vries et al. | 188/157 |
| 6,767,305 | B1 | * | 7/2004 | Backes et al. | 475/149 |
| 6,810,316 | B1 | * | 10/2004 | Yokoyama et al. | 701/70 |

FOREIGN PATENT DOCUMENTS

| DE | 43 12 524 A1 | 10/1994 |
|---|---|---|
| WO | 00/45064 | 8/2000 |
| WO | 01/38750 | 5/2001 |

* cited by examiner

*Primary Examiner*—Robert A. Siconolfi
*Assistant Examiner*—Devon Kramer
(74) *Attorney, Agent, or Firm*—Merchant & Gould P.C.

(57) ABSTRACT

A screw actuator comprises a housing (1), a screw mechanism (4) with a nut (6) and a screw (5), as well as a motor (7) which is drivingly connected to the screw. The screw (6) is rotatably and translatably supported with respect to the nut (5), which is fixed with respect to the housing (1). The screw engages a translatable, non rotatable actuating head (29) through a swivel connection. The swivel connection comprises a pair of conformed surfaces (41, 42) having a common rotational axis of symmetry which is aligned with the axis of the screw mechanism.

5 Claims, 1 Drawing Sheet

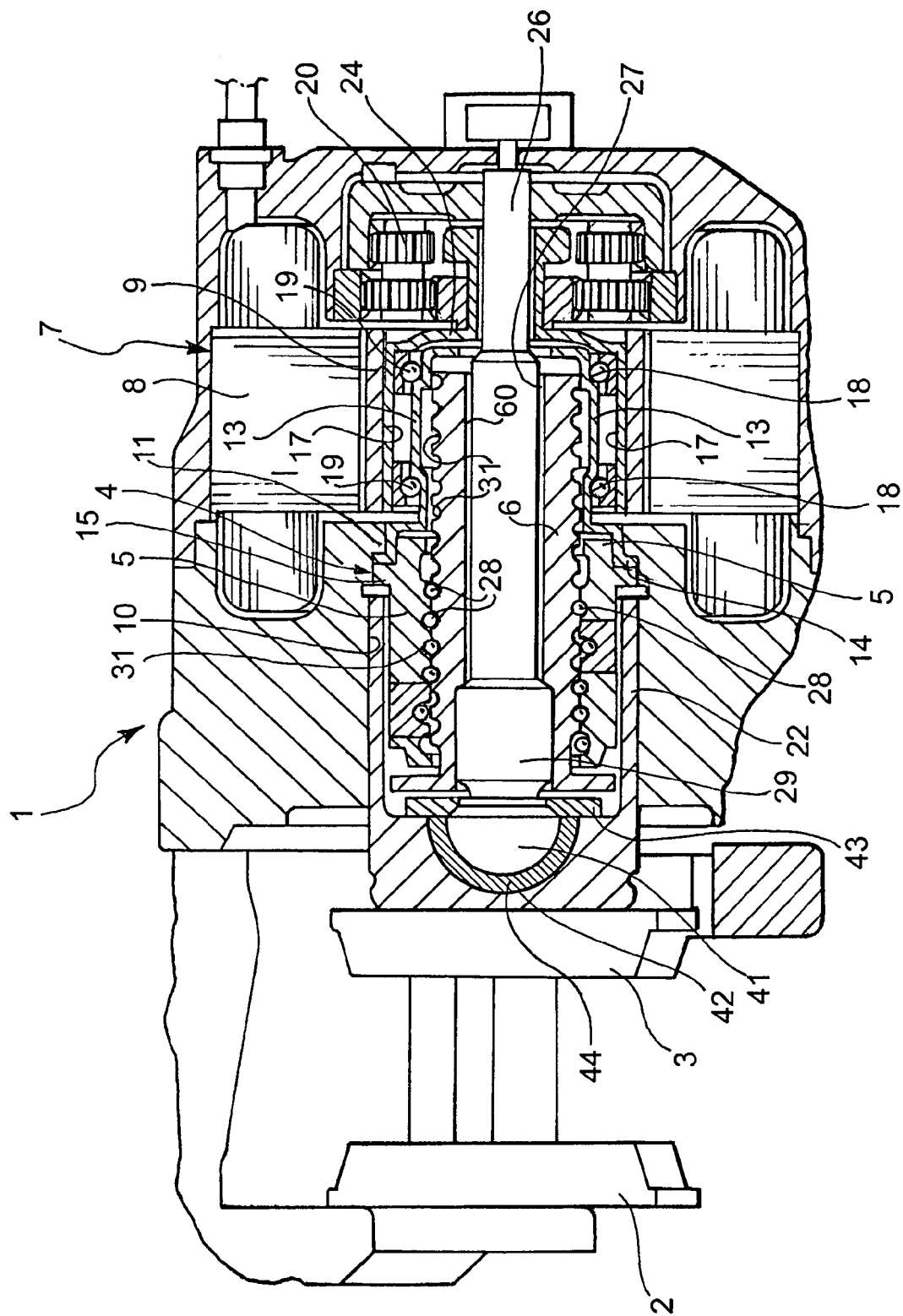

SCREW ACTUATOR WITH A FIXED NUT

The invention is related to a screw actuator, comprising a housing, a screw mechanism with a nut and a screw, as well as a motor which is drivingly connected to the screw, said screw being rotatably and translatably supported with respect to the nut which is fixed with respect to the housing, and engages a translatable, non rotatable actuating head through a swivel connection.

Such a screw actuator comprises a nut which is fixed with respect to the housing, that is a nut which is neither rotatable nor translatable. Consequently, the screw should be able to carry out both a rotation and a translation. However, as the actuating head should only be subjected to translations, a swivel should be present between the screw and the actuating head.

The object of the invention is to provide a screw actuator of this type having an improved swivel connection, which also allows for a limited misalignment or movements resulting from the inevitable elastic deformations which develop under the influence of actuating forces.

This object is achieved in that the swivel connection comprises a pair of conformed surfaces having a common rotational axis of symmetry which is aligned with the axis of the screw mechanism.

The conformed surfaces are in low friction contact with each other, which means that a low friction coating or a lubricant can be provided on their contacting surfaces.

Preferably, the screw comprises a convex surface, and the actuating head comprises a correspondingly shaped concave surface. The surfaces may constitute a ball swivel connection.

In the latter case, the actuating head may tilt with respect to the screw. Thus, the screw mechanism is protected from bending moments, with respect to which roller screw, ball screw or friction screw mechanisms are rather vulnerable.

Also, the actuating head may be formed by a piston which is slideably accommodated in a cylinder bore in the housing. Although in this embodiment the piston/cylinder engagement represents a firm support for the actuating head, nevertheless still some tilting may occur under high actuating forces. This, in such embodiment as well the ball swivel embodiment has favorable effects.

According to an advantageous embodiment, a stack of piezo-electric material layer is enclosed between the surfaces. The actuating forces exerted by the screw actuator can be measured in a reliable manner through such sensor of piezo-electric material.

The invention will now be described further with reference to an embodiment shown in the FIGURE which shows a cross section.

The FIGURE shows a brake calliper comprising a screw actuator 4 having a nut 5, which by means of balls 28 rotatably supports a screw 6. The nut 5 and screw 6 have appropriately shaped screw type grooves 31.

An electric motor 7 has a stator 8 connected to the housing 1, as well as a rotor 9; which is supported by a sleeve 17 rotatably mounted on a stationary supporting sleeve 13. The supporting sleeve 13 comprises raceways 18 for the bearings 19. In the alternative, the sleeve may of course carry the inner rings of separate bearings.

The inner supporting sleeve 13 has an outwardly extending sleeve flange 14, which is axially held between a radially inwardly extending support abutment 11 of the housing 1 and an outwardly extending nut flange 15.

The outwardly extending nut flange 15, as well as the sleeve 13 are fitted within the cylindrical cavity or bore 10 of the housing 1. The support abutment 11 extends radially inwardly with respect to the wall of the cylindrical bore 10.

Non-rotatably held within the bore 10 is a piston 22, within which an actuating head 29 is accommodated. Through a swivel connection 41, 42, the actuating head 29 engages the screw 6 of the screw actuator 4. Separation of the swivel is prevented by means of plate 43.

By activating the motor 7, the rotor 9 drives for rotation the screw 6 of the screw actuator 4, via a shaft 26. Said shaft 26 is connected on one side to a reduction gear mechanism 20 which is driven by the rotor 9 through the rotor sleeve 17 and an inwardly extending flange 24 thereof. At the other side, the central drive shaft 26 extends into a cylindrical bore 27 of the screw 6. The shaft 26 is non-rotatably coupled to the screw 6 through a spline groove coupling 60.

As a result, the screw 6 is rotated and moved outwardly, so as to bring brake pad 3 closer to brake pad 2 for exerting a braking effect on a brake disk (not shown).

As a result of the compressive forces thereby exerted on the nut 5, the support sleeve 13 is held firmly clamped against the support abutment 11 of the housing 1.

With the aim of accommodating misalignments, which might damage the raceways and balls of the screw actuator, the flange 14 of sleeve 13 as well as the nut flange 15 may be curved preferably along the surface of an imaginary sphere, so as to allow some adaptation of the screw actuator 4 together with the rotor 9 and the gear reduction mechanism 20.

The swivel part 41, 42 comprises a concave surface 42 of the piston 22, and a convex surface 41 of the actuating head 29. Between these surfaces 41, 42, a lubricant may be present. Moreover, a stack of piezo-electric elements 44 may be applied to one or both of the surfaces, with the aim of measuring actuating forces.

What is claimed is:

1. A screw actuator, comprising:
    a housing;
    a screw mechanism with a nut and a screw; and
    a motor which is drivingly connected to the screw, said screw being rotatably and translatably supported with respect to the nut which is fixed with respect to the housing, the screw engaging a translatable, nonrotatable actuating head through a swivel connection comprising a pair of conformed surfaces having a common rotational axis of symmetry which is aligned with an axis of the screw mechanism;
    wherein a stack of piezo-electric material layers is enclosed between the surfaces, wherein the surfaces are spherical; and
    wherein the screw comprises a convex surface, and the actuating head comprises a correspondingly shaped concave surface, or vice versa.

2. A screw actuator according to claim 1, wherein the actuating head is formed by a piston which is slideably accommodated in a cylinder bore in the housing.

3. A screw actuator according to claim 1, wherein the screw engages a rotatable drive shaft through a ball spline joint, said shaft being connected to a rotor of the motor through a gear reduction mechanism.

4. A screw actuator according to claim 1, wherein the screw mechanism comprises a ball screw, a roller screw or a friction screw.

5. A screw actuator, comprising:
    a housing;

a screw mechanism with a nut and a screw; and a motor which is drivingly connected to the screw, said screw being rotatably and translatably supported with respect to the nut which is fixed with respect to the housing, the screw engaging a translatable, nonrotatable actuating head through a swivel connection comprising a pair of conformed surfaces having a common rotational axis of symmetry which is aligned with an axis of the screw mechanism;

wherein a stack of piezo-electric material layers is enclosed between the surfaces, wherein the surfaces are spherical and constitute a ball swivel connection; and wherein the screw comprises a convex surface, and the actuating head comprises a correspondingly shaped concave surface, or vice versa.

* * * * *